United States Patent
Glas et al.

(10) Patent No.: US 9,469,396 B1
(45) Date of Patent: Oct. 18, 2016

(54) AIRCRAFT LANDING GEAR

(71) Applicant: Liebherr-Aerospace Lindenberg GmbH, Lindenberg/Allgäu (DE)

(72) Inventors: Peter Glas, Betzigau (DE); Christian Schilling, Maierhöfen (DE); Klaus Schmelz, Grünenbach (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 105 days.

(21) Appl. No.: 14/446,951

(22) Filed: Jul. 30, 2014

(30) Foreign Application Priority Data

Jul. 31, 2013 (DE) ........................ 10 2013 012 812

(51) Int. Cl.
| | |
|---|---|
| *B64C 25/14* | (2006.01) |
| *B64C 25/20* | (2006.01) |
| *B64C 25/26* | (2006.01) |
| *B64C 25/18* | (2006.01) |
| *B64C 25/22* | (2006.01) |
| *B64C 25/24* | (2006.01) |

(52) U.S. Cl.
CPC .............. *B64C 25/26* (2013.01); *B64C 25/18* (2013.01); *B64C 25/22* (2013.01); *B64C 25/24* (2013.01)

(58) Field of Classification Search
CPC ....... B64C 25/18; B64C 25/22; B64C 25/24; B64C 25/26
See application file for complete search history.

(56) References Cited

U.S. PATENT DOCUMENTS

| | | | | |
|---|---|---|---|---|
| 5,310,139 A | * | 5/1994 | Derrien ..................... | F16F 9/18 244/104 FP |
| 6,817,175 B2 | * | 11/2004 | Collet ....................... | B62D 5/30 60/405 |
| 8,393,565 B2 | * | 3/2013 | Frank ....................... | B64C 25/44 244/100 R |
| 8,556,209 B2 | * | 10/2013 | Luce ........................ | B64C 25/14 244/102 SS |
| 8,973,869 B2 | * | 3/2015 | Onomichi ............... | B64C 25/22 244/102 A |
| 2005/0082427 A1 | * | 4/2005 | Seung ...................... | B64C 25/16 244/102 R |
| 2005/0110339 A1 | | 5/2005 | Kolberg | |
| 2012/0138734 A1 | | 6/2012 | Hissong | |
| 2013/0105624 A1 | * | 5/2013 | Dubois .................... | B64C 25/24 244/102 R |

FOREIGN PATENT DOCUMENTS

DE   10 2008 006 295 A1   7/2009

* cited by examiner

*Primary Examiner* — Philip J Bonzell
(74) *Attorney, Agent, or Firm* — Dilworth & Barrese, LLP

(57) ABSTRACT

The invention relates to an aircraft landing gear, particularly a front landing gear with at least one EHDC unit, which has at least one electric motor and at least one hydraulic pump, whereby at least one adjusting device is provided for the adjustment of the position of the aircraft landing gear, whereby the adjusting device comprises at least one actuator for driving the adjusting device, whereby the steering angle and/or the steering speed and/or the retraction speed and/or the extension speed and/or the end position damping and/or the position of the adjusting device can be controlled or adjusted by means of the electric motor driving the at least one actuator of the adjusting device by means of the hydraulic pump.

11 Claims, 1 Drawing Sheet

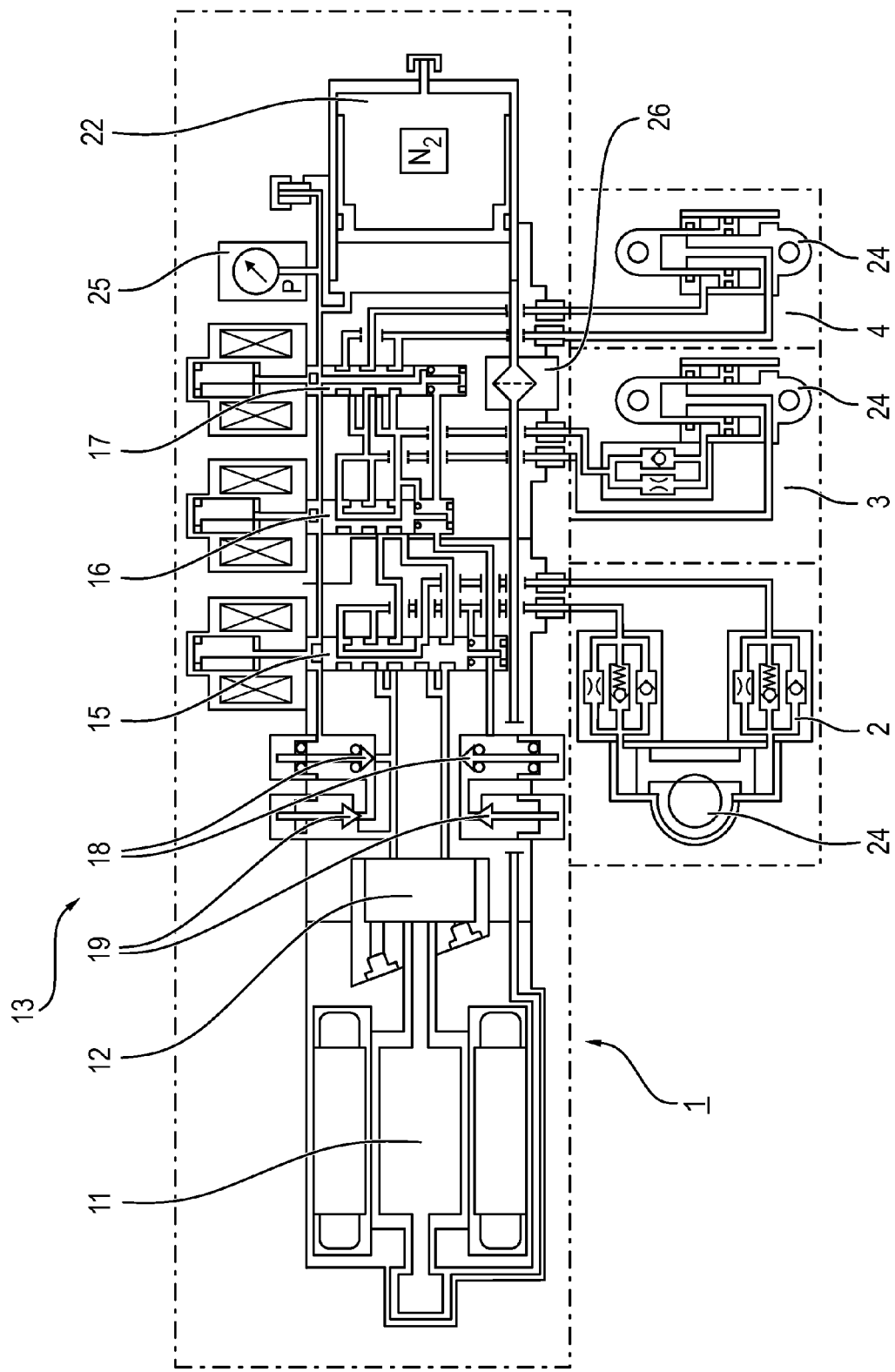

AIRCRAFT LANDING GEAR

BACKGROUND OF THE INVENTION

The present invention relates to an aircraft landing gear with at least one electrohydraulic drive and control unit (EHDC unit), as well as an aircraft with such an aircraft landing gear.

Aircraft landing gears with EHDC units are known from the state of the art, and are used in aircraft for the purpose of operating certain hydraulic actuators of the aircraft landing gear by means of an electric motor and a hydraulic pump.

These actuators can thereby be designed for the purpose of controlling different functions of the aircraft, such as moving the control surfaces or the landing gear of the aircraft, for example. If the actuators are used in the landing gear, then the EHDC unit takes over the steering of the aircraft if the aircraft is being moved on the ground by means of the landing gear. Alternately, such EHDC units can also make it possible to control the retraction and/or the extension of the landing gear from a landing gear shaft or an emergency extension or dropping of the landing gear from the landing gear shaft, as the case may be. In these EHDC units, which are designed in a decentralized manner, the application is consequently carried out in a way specially adjusted to individual users.

This construction design has the problem that, under certain circumstances, a multiplicity of EHDC units must be provided in order to control the individual functions of the aircraft, or that special servo actuators are required for the control of the movement of the actuators.

One alternate construction design, which is likewise known from the state of the art, supplies the actuators of control surfaces or landing gear, for example, from the central hydraulic system of the aircraft. The actuators are thereby controlled by means of valves that are provided at the corresponding points, that is to say, on the landing gear, for example, and particularly on the front landing gear.

This construction design has the problem, on the other hand, that hydraulic lines for hydraulic supply have to be brought from the central hydraulic pumps, such as from the engines of the aircraft and into the front of the aircraft, for example, which entails considerable expense in terms of integration, price, and weight.

SUMMARY OF THE INVENTION

The task of the present invention is thus to provide a device that overcomes the problems stated above.

This task is solved, in accordance with the invention, by means of a device, in accordance with which an aircraft landing gear, particularly a front landing gear, is provided with at least one EHDC unit that has at least one electric motor and at least one hydraulic pump, whereby at least one adjusting device is provided for the adjustment of the position of the aircraft landing gear, whereby the adjusting device comprises at least one actuator for driving the adjusting device, whereby the steering angle and/or the steering speed and/or the retraction and/or the extension speed and/or the end position damping and/or the position of the adjusting device can be controlled or adjusted by means of the electric motor driving the at least one actuator of the adjusting device by means of the hydraulic pump.

The control or guidance of the steering angle and/or steering speed and/or retraction speed and/or extension speed and/or end position damping and/or position of the adjusting device by means of the electric motor in accordance with the invention makes it possible to dispense with the special servovalves that are otherwise conventionally used. The construction of the device is thereby advantageously simplified. The said control is carried out through the rotational speed and/or direction of rotation of the electric motor.

Use is hereby made of the fact that the retraction or extension of the landing gear, as the case may be, as well as the steering of the landing gear, never occur simultaneously, for which reason a common motor/pump unit can preferably be used for these functions. It is thus advantageously made possible to provide the EHDC unit in a decentralized manner in an area in which a hydraulic supply is necessary. This might thereby involve the landing gear area of an aircraft, for example. Through the possibility of the combination of the different control means, it is advantageously possible to carry out or to control various functions or uses or adjusting devices of the landing gear, as the case may be, by means of an individual EHDC unit. As the result of this, savings in weight result, since a majority of EHDC units are no longer needed on the landing gear for the performance of different functions.

In comparison with the alternate forms of implementation known from the state of the art, in which hydraulic actions are supplied from a central hydraulic system, a weight advantage likewise results through the elimination of connecting lines between the central hydraulic system and the users.

The adjusting devices can, in addition to corresponding actuators, thereby also comprise components, such as a landing gear control and/or landing gear retraction device and/or landing gear extension device and/or landing gear locking device, as well as corresponding means for their control. These means may comprise a valve block with one or more integrated valves, particularly slide valves. The means for the control of the components can, in addition, comprise valves, such as selector valves, unblocking valves, free-fall valves, overpressure valves, anti-cavitation valves and/or anti-flutter valves, which can be integrated into a valve block.

Additional advantageous forms of implementation of the invention are the object of the sub-claims. Thus, in one preferred embodiment, it is conceivable for the electric motor to be designed in such a manner that the control or guidance of the at least one actuator is carried out through the direction of rotation and/or speed of the electric motor. The electric motor can, consequently, assume the control of the at least one actuator by means of its operating parameters, its direction of rotation and/or speed, either directly or by means of the hydraulic pump, as the case may be. Additional control devices are advantageously not necessary.

In one additional preferred embodiment, it is conceivable for the hydraulic pump to be designed for a consumption-dependent production of pressure.

A hydraulic pump thus designed can, advantageously, be flexibly adjusted to different scenarios of use. It is conceivable for the hydraulic pump to be adjusted, such as through a change of its geometry, for example, both for users that require a high flow rate with low pressure difference, as well as for users with a low flow rate and a high pressure difference. A regulated hydraulic pump can consequently be used.

In one particularly preferred embodiment, it is thereby conceivable for the actuator or the actuators to be balanced actuators.

In these actuators, the oil volume is equal on both sides of the actuator, that is to say, at both the intake and the outflow, as the result of which, advantageously, no additional storage space is needed for unnecessary hydraulic fluid.

In one particularly preferred embodiment, an aircraft landing gear, in which one or more adjusting devices in the form of the landing gear control and/or landing gear retraction device and/or landing gear extension device and/or landing gear locking device are provided, is conceivable.

In one additional preferred embodiment, an aircraft landing gear in which, in the case of several adjusting devices, each one comprises at least one actuator for driving the adjusting device, is conceivable.

In one additional preferred embodiment, an aircraft landing gear, in which at least one adjusting device is designed with means for controlling or regulating a landing gear control and/or with means for controlling or regulating a landing gear retraction device and/or the landing gear extension device and/or with means for controlling or regulating a landing gear locking device, is conceivable.

In one additional preferred embodiment, an aircraft landing gear, in which the EHDC unit comprises at least one valve block with one or more integrated valves, particularly slide valves, whereby it is preferably provided that the means in accordance with claim 7 are formed by one or more of the valves, is conceivable.

In one additional preferred embodiment, an aircraft landing gear, in which the EHDC unit has additional, preferably all, functional components of the EHDC unit necessary for the operation of the landing gear control and/or landing gear retraction device and/or landing gear extension device and/or landing gear locking device, are integrated into the valve block in accordance with claim 8, is conceivable. Such an integrated construction of the valve block makes possible a particularly low-wear, reliable, and compact construction design of the EHDC unit, and thereby of the landing gear as well.

In one additional preferred embodiment, an aircraft landing gear, in which the EHDC unit comprises at least one reservoir, at least one pressure sensor, and at least one hydraulic filter, is conceivable. The reservoir, the pressure sensor, and the hydraulic filter thereby make possible a secure and controlled operation of the EHDC unit. In particular, a spring-loaded reservoir acted on by nitrogen can reduce the effects of cavitation and excess pressure in the system or prevent them from forming, as the case may be.

In one additional preferred embodiment, it is conceivable for the electric motor to be a regulated, brushless DC motor and/or for the hydraulic pump to be a fixed-delivery pump, whereby the hydraulic pump, in particular, is designed as an axial piston pump and/or that the reservoir is a spring-loaded reservoir.

In one additional preferred embodiment, it is conceivable for the EHDC unit to have a valve block, which comprises at least one selector valve, one unblocking valve and one free-fall valve, as well as at least one overpressure valve and/or an anti-cavitation valve and/or anti-flutter valve.

Through the configuration of the valve block with a selector valve, an unblocking valve, and a free-fall valve, it is advantageously made possible to control three separate functions separately from one another by means of one and the same valve block. If at least one overpressure valve, one anti-cavitation valve, and/or one anti-flutter valve are thereby additionally provided in the valve block, then the construction of the EHDC unit is, furthermore, advantageously simplified or reduced in size, as the case may be.

One additional embodiment provides an aircraft landing gear in which the EHDC unit comprises a controller, which is designed with the architecture of a control monitor, whereby input data is input into the controller by means of an AFDX bus and whereby the controller controls the electric motor and the valves.

The controller or the control unit, as the case may be, thereby advantageously bundles all or a large portion of the control functions or control calculations, as the case may be, that are needed for the operation of the EHDC unit and is designed for a closed loop control. The power electronics of the EHDC unit is supplied with a voltage of ±270 volts. The power electronics thereby controls the brushless DC motor and the hydraulic valves through the signals of a control channel.

The control channel itself thereby controls the power electronics, whereby, in a landing gear control, the steering angles are regulated with appropriate steering speed and precision and, upon the retraction and/or extension of a landing gear by means of a landing gear retraction device and/or landing gear extension device, the speed of movement of the landing gear, and the timing and the end position damping, are regulated.

A monitor channel of the controller can thereby monitor the function of the EHDC unit and, in the event of deviations, shift it. It is conceivable, in the event of deviations, for the steering system or the landing gear control, as the case may be, to be switched into a failsafe mode or, for example, for the landing gear retraction device and/or the landing gear extension device or the retraction/extension system, respectively, to switch into a free mode or modus, as the case may be, in order to thus make a free extension possible.

It is also conceivable for the controller to comprise an alternate extension channel which is galvanically separated and supplies an actuator for alternate operation or extension, as the case may be, with 28 VDC.

The invention is likewise directed at an aircraft with an aircraft landing gear.

BRIEF DESCRIPTION OF THE DRAWINGS

Additional details and advantages of the invention will now be illustrated in further detail by means of an embodiment depicted in the figures. These depict the following:

FIG. 1: A schematic representation of an EHDC unit with three adjusting devices.

DESCRIPTION OF THE PREFERRED EMBODIMENTS

FIG. 1 shows a schematic representation of the electrohydraulic drive and control unit (EHDC unit) 1, with means provided on it for controlling different adjusting devices. In the embodiment depicted, the adjusting devices involve a landing gear control 2 with a corresponding hydraulic actuator 24 or control motor, as the case may be a landing gear retraction device and/or a landing gear extension device 3 with corresponding actuator 24, as well as a landing gear locking device 4 for locking or unlocking the landing gear, as the case may be.

The EHDC unit 1 comprises an electric motor 11, which can be designed as a regulated, brushless DC motor. A hydraulic pump 12, which can be designed as a fixed-delivery pump or an axial piston pump, as the case may be, is connected with the electric motor 11.

The operation of the hydraulic pump and, consequently, the function of the actuator or the actuators 24 as well, is controlled or regulated by means of the rotational speed and/or the speed of the electric motor.

The EHDC unit 1 additionally comprises a valve block 13, which comprises one or more integrated valves. The valves can thereby be constructed as slide valves and form the means for controlling the adjusting devices.

In the embodiment depicted, the EHDC unit 1 comprises different supplemental devices, such as a reservoir 22, a pressure sensor 25, or a hydraulic filter 26.

The valve block 13 of the EHDC unit 1 comprises, in the embodiment depicted, a selector valve 15, by means of which both the landing gear control 2, as well as the unblocking valves 16 and free-fall valves 17 that are additionally provided on the valve block 13, can be triggered. The selector valve 15 can thereby be adjusted in such a way that, when it is in a condition in which the aircraft is standing on the runway with its landing gear extended, it makes possible the flow of hydraulic fluid through the actuator of the landing gear control 2. The steering deflection is thereby carried out by controlling the electric motor 11. The additional valves, the unblocking valve 16, and the free-fall valve 17 can thereby be designed in such a way that they do not permit any movement of the actuators they trigger.

The unblocking valve 16 is connected with a landing gear retraction device and/or a landing gear extension device 3; this device can thereby be designed as an integrated device, for example, both for the retraction as well as for the extension of the landing gear, or else separate forms of implementation, in which the extension and the retraction are brought about by different devices, can also be provided.

By means of the free-fall valve 17, it is possible to control a landing gear locking device and thus to unlock the landing gear of an aircraft, such as in the event of an emergency, for example, in such a way that it is extended or retracted because of its dead weight, as the case may be. An electrohydraulic actuator that is attached independently, such as to the structure of a landing gear shaft, for example, can thereby unlock the landing gear for the event that a normal extension of the landing gear is not possible.

For the improvement of the functionality of the EHDC unit 1, the valve block 13 additionally comprises two overpressure valves 18, by means of which undesirable or disadvantageous excess compression ratios in the valve block 13 can be controlled. The overpressure valves 18 are thereby designed for the purpose of reducing excess pressures through elimination of the same or through an increase of temperature.

In addition, anti-cavitation valves 19, which are designed to reduce possible cavitations in the area of the valve block 13, are provided. Such cavitations can appear because of different volumes and thermal expansions in the hydraulic system or in the hydraulic lines of the EHDC unit 1, as the case may be, and potentially lead to an impairment of the system components.

An anti-flutter valve, which prevents a swinging up of the landing gear, can likewise be provided.

The EHDC unit 1 described can thereby be installed in an aircraft landing gear, particularly in a front landing gear, where it is then connected with at least three adjusting devices. The adjusting devices comprise the landing gear control 2, a landing gear retraction device and/or landing gear extension device 3, as well as a landing gear locking device 4.

In the EHDC unit 1 depicted in FIG. 1, the electric motor 11 drives the hydraulic pump 12 which, in turn, conveys a pressure-stressed hydraulic medium to the connected valve block 13. In the valve block 13, the hydraulic medium is, by means of the valves provided there, which are triggered by means of a controller, distributed to the users or adjusting devices, as the case may be, that are connected with the EHDC unit 1. An end position damping of the actuators, as well as a precise control and determination of the position of the actuators of the adjusting devices, is thereby provided by means of the rotational speed of the electric motor 11. It can thereby be provided that the control is carried out by means of a constant supply of pressure—that is to say, only as much pressure as is needed by the actuators is produced. It is also possible to compute or to determine, as the case may be, the position of the actuators or the position of the landing gear, as the case may be, by counting the pumping cycles.

The invention claimed is:

1. Aircraft landing gear, particularly a front landing gear, with at least one electrohydraulic drive and control unit (1), which has at least one electric motor (11) and at least one hydraulic pump (12), comprising
   adjusting devices for the adjustment of the position of the aircraft landing gear in the form of a landing gear control (2), a landing gear extension and retraction device (3) and a landing gear locking device (4),
   actuators (24) arranged for driving each said adjusting device, and
   a valve block (13) arranged to control flow of hydraulic fluid through the respective actuators (24) of the landing gear control (2), the landing gear extension and retraction device (3) and the landing gear locking device (4),
   such that the steering angle, the steering speed, the retraction speed, the extension speed, the end position damping and the position of the adjusting devices can all be controlled or adjusted by the single electric motor (11) driving the respective actuators (24) of the adjusting devices through the hydraulic pump (12).

2. Aircraft landing gear in accordance with claim 1, wherein the electric motor (11) is designed in such a way that the control or guidance of the actuators (24) is carried out through the direction of rotation and/or the speed of the electric motor (11).

3. Aircraft landing gear in accordance with claim wherein the hydraulic pump (12) is designed for a consumption-dependent production of pressure.

4. Aircraft landing gear in accordance with claim 1, wherein the EHDC unit (1) comprises at least one reservoir (22), at least one pressure sensor (25), and at least one hydraulic filter (26).

5. Aircraft landing gear in accordance with claim 1, wherein the valve block (13) comprises at least one selector valve (15), an unblocking valve (16), and a free-fall valve (17), as well as at least one overpressure valve (18) and/or an anti-cavitation valve (19) and/or an anti-flutter valve.

6. Aircraft landing gear in accordance with claim 1, wherein the EHDC unit (1) comprises a controller, which is designed with the architecture of a control monitor, input data is input, by an Avionics Full-Duplex Switched Ethernet bus, into the controller, and the controller controls the electric motor (11) and the valves.

7. Aircraft with at least one aircraft landing gear in accordance with claim 1.

8. Aircraft landing gear in accordance with claim 1, wherein the actuators (24) are balanced actuators (24).

9. Aircraft landing gear in accordance with claim 4, wherein the electric motor (11) is a regulated, brushless DC motor and/or the hydraulic pump (12) is a fixed-delivery pump, whereby the hydraulic pump (12) is particularly designed as an axial piston pump and/or the reservoir (22) is a spring-loaded reservoir (22).

10. Aircraft landing gear in accordance with claim 1, wherein the valve block (13) comprises
   a pair of anti-cavitation valves (19),
   a pair of overpressure valves (18) coupled to a respective anti-cavitation valve (19),
   a selector valve (15), an unblocking valve (16) and a free-fall valve (17) each coupled to the overpressure and anti-cavitation valves (18, 19),
   the selector valve (15) arranged for triggering the landing gear control (2), the unblocking valve (16) and the free-fall valve (17),
   the unblocking valve (16) connected with the landing gear extension and retraction device (3), and
   the free-fall valve (17) connected with the landing gear locking device (4).

11. Aircraft landing gear in accordance with claim 10, wherein the valve block (13) additionally comprises a reservoir (22), a pressure sensor (25), and a hydraulic filter (26).

* * * * *